Dec. 10, 1935.  N. D. LEVIN  2,023,481
MOTOR SUSPENSION
Original Filed March 28, 1929  2 Sheets-Sheet 1

INVENTOR
Nils D. Levin.

Dec. 10, 1935.　　　　N. D. LEVIN　　　　2,023,481
MOTOR SUSPENSION
Original Filed March 28, 1929　　2 Sheets-Sheet 2
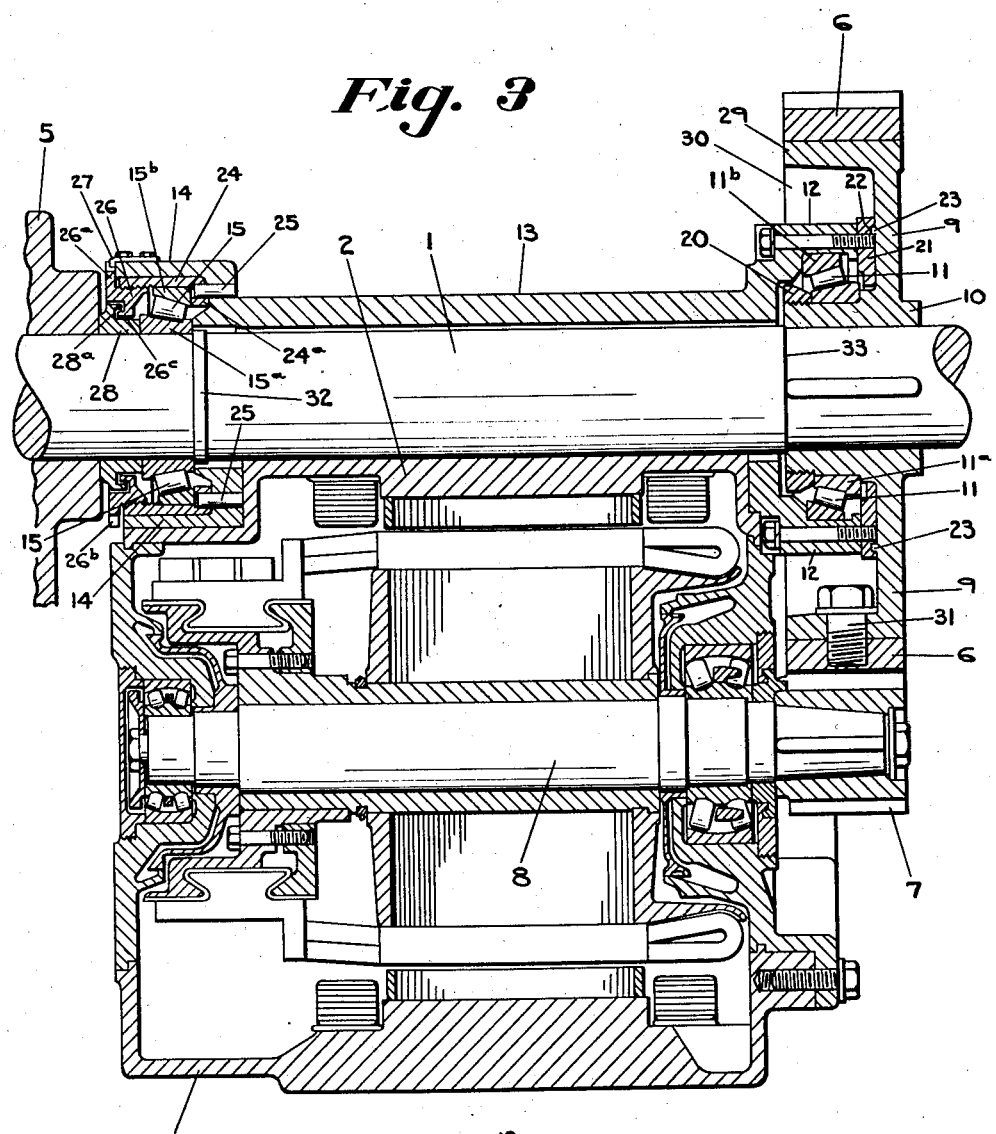
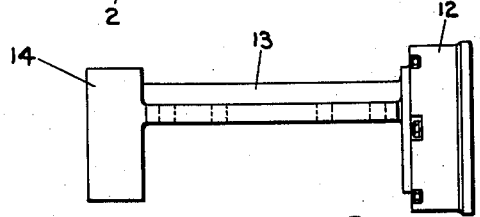
INVENTOR
Nils D. Levin.

Patented Dec. 10, 1935

2,023,481

UNITED STATES PATENT OFFICE 2,023,481

MOTOR SUSPENSION

Nils D. Levin, Columbus, Ohio, assignor to The Jeffrey Manufacturing Company, Columbus, Ohio, a corporation of Ohio Original application March 28, 1929, Serial No. 350,635. Divided and this application July 9, 1931, Serial No. 549,765

3 Claims. (Cl. 308—207)

The present invention relates to anti-friction bearings particularly adapted for use in connection with motor suspension although it may have a general application. The present application is a division of my co-pending application, Serial No. 350,635, filed March 28, 1929, for Motor suspension of the type applicable to the support of the actuating motor upon the axle of an electric locomotive.

One of the objects of this invention is to provide improved and efficient anti-friction bearings for motor suspension mountings.

Another object of the invention is the provision of improved and efficient adjusting mechanism for anti-friction bearings associated with an axle on which is suspended an electric motor.

A further object of the invention is the provision of adjusting mechanism for spaced apart anti-friction bearings which are entirely enclosed.

More particularly it is the object of the present invention to provide anti-friction bearings in enclosed housings of a motor suspension mounting combined with means operable exteriorly of the mounting to adjust the anti-friction bearings to take up wear.

Other objects of the invention will appear hereinafter, the novel features and combinations being set forth in the appended claims.

In the accompanying drawings Fig. 1 is a plan view of a motor and axle of an electric locomotive equipped with my improved anti-friction bearings and adjusting mechanism therefor.

Fig. 3 is a sectional plan view on an enlarged scale taken along the line III—III of Fig. 2; and Fig. 4 is a detail of the suspension mounting comprising a housing for the anti-friction bearings by means of which the motor is supported upon the axle.

Figure 1:
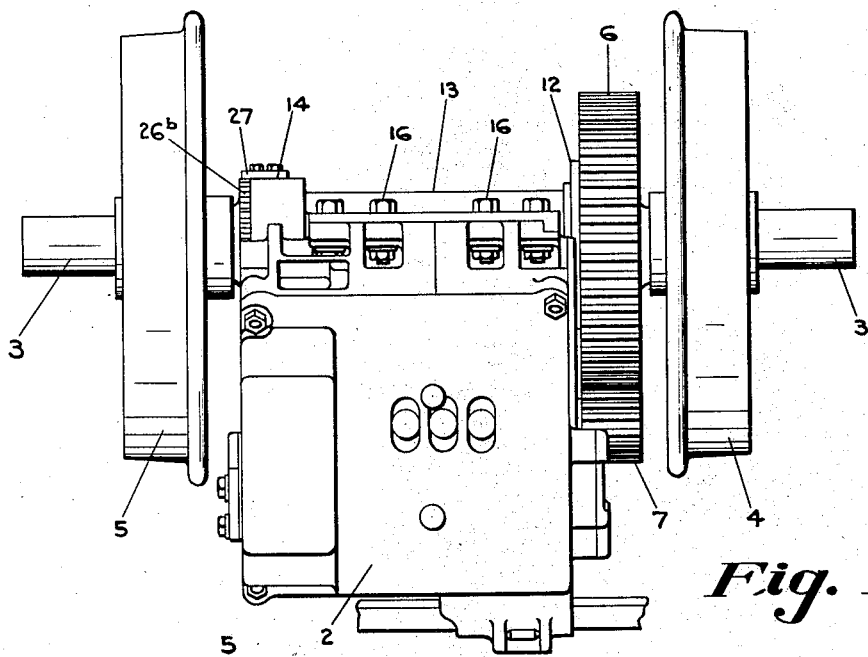

In the recovery of coal or other materials from their native beds in mines, tunnels or entries are driven into the vein or seam from which rooms are extended laterally, in which rooms the principal mining operations are conducted. Railway tracks are laid in these entries along which travel the cars whereby the materials mined are transported from the mine. Electric locomotives are usually employed to transport these cars along the mine tracks and because of the low roofs, narrow passages and sharp curves commonly occurring in mines it is desirable that the locomotive should be very compact, have a short wheel base and be of small external dimensions while at the same time such locomotive has great strength, durability and power. Such locomotives have the driving motor positioned between the track wheels and supported at one side by the framework of the locomotive and at the other side by the journal bearings engaging the axle to which the armature of the motor is connected by a single pair of speed reducing gears. There is an ever insistent demand for locomotives of greater power and more compact design having relatively small external dimensions particularly longitudinally of the motor armature.

In the accompanying drawings I have shown an axle 1 with which is associated an electric motor of a locomotive of the class described constructed in accordance with my present invention and as claimed in my said co-pending application Serial No. 350,635.

The motor 2 by being connected at one side to the framework of the locomotive and at its other side to the axle 1, is adapted to drive the axle or rotate the same by means of the gearing 6, 7.

At the ends of the axle 1 are journals 3 adapted to engage the journal boxes by means of which the frame of the locomotive is supported upon the axle in the usual and well understood manner. Fixed to the axle 1 immediately inside of the journals 3 are the track wheels 4 and 5 of the common and well known type adapted to rest upon and travel along the rails of a suitable mine track or trackway.

Adjacent one of the wheels such as that designated 4 in Fig. 1 is positioned a spur gear 6 which is engaged by the pinion 7 secured to the armature 8 of the electric motor 2. The gear 6 is provided with a supporting web 9 positioned at the edge of the nearest wheel 4 and this web is formed integral with the hub 10 and is keyed to the axle 1.

The supporting web 9 may have an annular flange 29 at its periphery to form an annular space 30 in which one of the anti-friction bearings is located. The gear 6 may be secured by means of cap screw 31 as shown in Fig. 3 to the annular flange 29.

Upon the periphery of the hub 10 within the annular space 30 is mounted a journal bearing comprising an inner race 11a, and outer race 11b and anti-friction rollers 11. The outer race 11ᵇ is supported in a cylindrical cup or housing 12 formed at the end of the suspension mounting 13 and concentric with the axle 1.

For the purpose of illustration I have shown the journal bearing on the hub 10 as a roller bearing. The proportion of the parts shown are such that the anti-friction bearings comprising the inner race 11ᵃ, outer race 11ᵇ and anti-friction rollers 11 lie wholly within the transverse bounding planes of the gear 6 extending at right angles to the axle 1.

At the end of the mounting 13 remote from the housing or cup 12 is formed a second cylindrical cup or housing 14 wherein is fitted the outer race 15ᵇ of another anti-friction bearing. The inner race 15ᵃ is secured to the axle 1 immediately to the left of the collar 32 as shown in Fig. 3. Anti-friction rollers 15 are located between the inner and outer races 15ᵃ and 15ᵇ.

The suspension mounting 13 is secured to the frame of the motor 2 by means of suitable attachment bolts 16 as shown in Fig. 1. This suspension mounting 13 serves to removably support the frame of the motor 2 upon the axle 1. The proportions of these parts are such that the suspension anti-friction bearings comprising the rollers 11 and 15 lie wholly within the transverse bounding planes of the motor 2 and the gear 6.

The necessity for maintaining running clearances between the operative parts of the locomotive and the top of the track rail places a limit upon the diameter of the gear 6 which much necessarily be materially less than the diameter of the track wheel 4. Since the power of the motor is directly proportional to the speed of its armature, relatively high armature speed is desirable.

Figure 2:
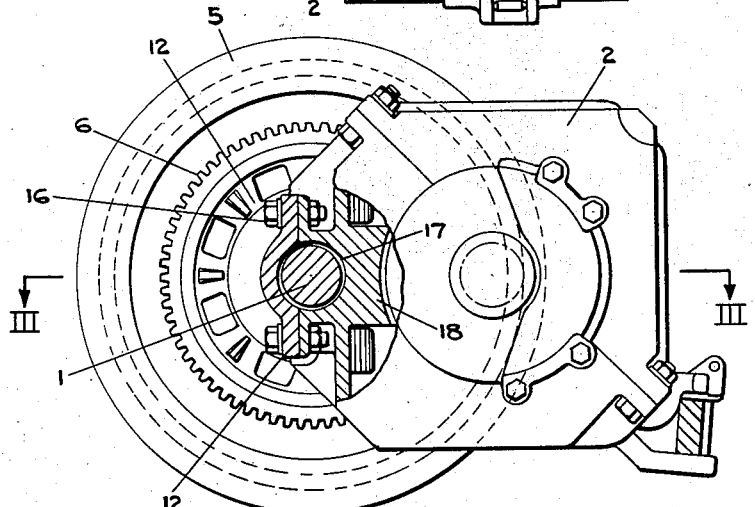
Fig. 2 is a side elevation of the structure shown in Fig. 1, certain parts being broken away and other parts being shown in section to illustrate the relation of the axle with one of the poles of the electric motor.

Maintenance of the desired relatively low rate of speed travel of the locomotive with relatively high armature speed entails the greatest possible gear ratio between the motor 2 and the axle 1. To reduce the distance between the centers of the armature 8 and the axle 1 so that the gear 6 may mesh with the relatively small pinion 7 I have provided as shown at 17 in Fig. 2 a longitudinally extending groove in the field frame of the motor into which the axle 1 projects laterally. By positioning this groove 17 in the central radial plane of the magnetic pole 18 of the motor, interference with the flow of the magnetic flux in the field frame is avoided.

According to a further aspect of the invention, means are provided for adjustment of the anti-friction bearings to compensate for the wear therein.

The inner race 11ᵃ at the right hand end of Fig. 3 is fixed to the hub of the web 9 and retained in position by means of a ring nut 20. The outer race 11ᵇ is fixed in the cup or housing 12. It should be noted that the inner and outer races 11ᵃ and 11ᵇ have opposed conical faces so that the rollers 11 also function as thrust bearings.

Fixed to the end of the cup 12 is a closure ring 21 provided with an annular groove 22 which is engaged by a circular rib 23 formed on the inner surface of the web 9. The closure ring 21 cooperates with the circular rib 23 to prevent the escape of lubricant from the anti-friction bearing comprising the rollers 11.

The inner race 15ᵃ of the left hand bearing shown in Fig. 3 is fixed to the axle 1 while the outer race 15ᵇ is fixed in a sleeve 24 which is longitudinally movable relatively to the axle 1 within the housing 14 but is restrained against rotation relative to the housing 14 by means of pins 25 fixed in the housing and projecting loosely into apertures formed in a radial flange 24ᵃ of sleeve 24.

The outer end of sleeve 24 is provided with internal threads which are engaged by a ring internal nut 26 having a radial flange 26ᵃ overlying the end of a cup or housing 14. The flange 26ᵃ is provided with peripheral teeth 26ᵇ adapted to be engaged by a locking member 27 removably fixed to the housing 14.

When end play of the mounting 13 is to be taken up by adjustment of the spaced apart anti-friction bearings the motor housing may be pushed to the right as viewed in Fig. 3 so as to take up the wear in the right hand anti-friction bearing thus bringing the ring 21 into closer relation with the web 9 of the gear 6 or in substantial contact with such web as shown in Fig. 3. The locking element 27 is then disengaged from the teeth 26ᵇ and nut 26 is rotated to move the sleeve 24 to the left thereby taking up the play in the outer race 15ᵇ. When the parts have been suitably adjusted locking element 27 is again engaged with the teeth 26ᵇ to retain the latter in adjusted position.

In order to retain the lubricant in the bearing 15, the nut 26 is provided with an annular rib 26ᶜ which engages in a groove 28ᵃ formed in the collar 28 mounted on the axle 1.

The collar 28 and the inner race 15ᵃ are held in fixed position on the axle 1 between the wheel 5 and the collar 32. The gear 6 has its hub 10 keyed to the axle 1 against the annular shoulder 33. When, therefore, the mounting 13 is thrust toward the right as shown in Fig. 3 to secure fitting of the parts as shown in the right hand portion of Fig. 3, the adjustment for end play due to wear may be made entirely by movement of the outer race 15ᵇ, and this adjustment may be made by the anti-friction bearings remaining entirely enclosed and while said bearings are rendered substantially dust proof by means of the ring 21, groove 22 and rib 23 at the right hand portion of Fig. 3, and by means of the inner annular rib 26ᶜ engaging into the groove 28ᵃ at the left hand portion of Fig. 3. Adjustment for wear may be made exteriorly of the mounting and of the housings 12 and 14 by turning the flange 26ᵃ.

By the arrangement of parts above described the size and power of the electric motor applicable to wheels and axles of given size and gauge may be materially increased; the axle and wheels may be removed from the locomotive without disturbing the electric connections of the electric motor, or the motor may be removed from the locomotive while it is supported upon the axle and the wheels.

Obviously those skilled in the art may make various changes in the details and arrangement of parts without departing from the spirit and scope of the invention as defined by the claims hereto appended and I wish, therefore, not to be restricted to the precise construction herein disclosed.

Having thus described and shown an embodiment of my invention, what I desire to secure by Letters Patent of the United States is:—

1. In a machine of the class described, the combination with an axle, of an anti-friction bearing adjacent each end of the axle and each including a pair of concentric races having opposed conical faces, the inner races being fixed to the axle, mounting means comprising a housing surrounding each of said bearings and a rigid spacing member connecting said housings, a threaded sleeve in one of said housings and in which one of the outer races is fixed, means holding said sleeve against rotation relative to its housing while permitting its adjustment in the longitudinal direction of the axle, said other outer race being fixed in the other of said housings, a ring nut engaging the threads of said sleeve and working against the housing upon rotation so as to adjust the sleeve and therewith said first named outer race, said spacing member and the other housing to adjust said other outer race, and means for locking said nut against rotation relative to said housing.

2. In a machine of the class described, the combination with an axle, of an anti-friction bearing adjacent each end of the axle and each including a pair of concentric races having opposed conical faces, the inner races being fixed to the axle, mounting means comprising a housing surrounding each of said bearings, said housings being rigidly connected, a sleeve in one of said housings and in which one of the outer races is fixed, said other outer race being fixed in the other of said housings, a collar operatively engaging said sleeve, said collar being provided with an abutment adapted to operatively engage the housing within which said sleeve is mounted, rotation of said collar causing said sleeve to be moved toward the same and to exert pressure upon said housing to adjust the bearing carried by the other housing.

3. In a machine of the class described, the combination with an axle, of an anti-friction bearing adjacent each end of the axle and each including a pair of concentric races having opposed conical faces, the inner races being fixed to the axle, mounting means comprising a housing surrounding each of said bearings, said housings being rigidly connected, a threaded sleeve in one of said housings and in which one of the outer races is fixed, means holding said sleeve against rotation relative to its housing while permitting its adjustment in the longitudinal direction of the axle, said other outer race being fixed in the other of said housings, a ring nut engaging the threads of said sleeve, said ring nut being provided with a flange adapted to engage the adjacent housing, rotation of said ring nut causing the latter to draw the sleeve and the outer race carried thereby toward the ring nut and causing the ring nut flange to press against the adjacent housing to adjust said other outer race.

NILS D. LEVIN.